(12) United States Patent
De Cesare et al.

(10) Patent No.: US 10,655,524 B2
(45) Date of Patent: May 19, 2020

(54) DEVICE TO SUPPLY AN INTERNAL COMBUSTION ENGINE WITH WATER COMING FROM A TANK OF AN EXHAUST SYSTEM PROVIDED WITH EXHAUST GAS AFTER-TREATMENT

(71) Applicant: MAGNETI MARELLI S.p.A., Corbetta (IT)

(72) Inventors: Matteo De Cesare, Torremaggiore (IT); Nicola Torcolini, Bologna (IT)

(73) Assignee: MAGNETTI MARELLI S.p.A., Corbetta (IT)

( * ) Notice: Subject to any disclaimer, the term of this patent is extended or adjusted under 35 U.S.C. 154(b) by 62 days.

(21) Appl. No.: 16/177,595

(22) Filed: Nov. 1, 2018

(65) Prior Publication Data

US 2019/0170036 A1    Jun. 6, 2019

(30) Foreign Application Priority Data

Nov. 3, 2017    (IT) .......................... 102017000125342

(51) Int. Cl.
*F01N 3/20*    (2006.01)
*F01N 11/00*    (2006.01)
(Continued)

(52) U.S. Cl.
CPC ........... *F01N 3/208* (2013.01); *F01N 3/2066* (2013.01); *F01N 9/00* (2013.01); *F01N 11/00* (2013.01);
(Continued)

(58) Field of Classification Search
CPC combination set(s) only.
See application file for complete search history.

(56) References Cited

U.S. PATENT DOCUMENTS 6,725,651 B2 * 4/2004 Itoh ........................ B01D 53/90
422/172
9,896,980 B2 * 2/2018 Gundrum .............. F01N 3/2066
(Continued)

FOREIGN PATENT DOCUMENTS

DE    4341739 C1    3/1995
EP    3153676 A1    4/2017

OTHER PUBLICATIONS

Search Report for Italian Patent Application No. 201700125342 dated Apr. 16, 2018.
(Continued)

*Primary Examiner* — Binh Q Tran
(74) *Attorney, Agent, or Firm* — Howard & Howard Attorneys PLLC

(57) ABSTRACT

A device to supply an internal combustion engine with water comprising one single tank of an exhaust system provided with exhaust gas after-treatment; the tank is divided, on the inside, into a first powder urea storage area and a second water collecting area, and wherein the powder urea and the water are mixed inside the tank so as to obtain a water solution of urea with a variable concentration, the device comprises at least one second electromagnetic injector, which is designed to inject water into the internal combustion engine, and a second pumping device, which is drowned inside the tank and draws from the second water collecting area in order to supply water under pressure to said at least one second electromagnetic injector.

12 Claims, 3 Drawing Sheets

(51) Int. Cl.
*F02B 47/02* (2006.01)
*F01N 9/00* (2006.01)
*F02M 25/022* (2006.01)
*F01N 13/16* (2010.01)
*B01D 53/94* (2006.01)

(52) U.S. Cl.
CPC .............. *F01N 13/16* (2013.01); *F02B 47/02* (2013.01); *F02M 25/0222* (2013.01); *F02M 25/0224* (2013.01); *F02M 25/0225* (2013.01); *B01D 53/9418* (2013.01); *B01D 53/9431* (2013.01); *B01D 53/9495* (2013.01); *B01D 2251/2062* (2013.01); *B01D 2258/01* (2013.01); *F01N 2570/14* (2013.01); *F01N 2610/02* (2013.01); *F01N 2610/10* (2013.01); *F01N 2610/12* (2013.01); *F01N 2610/144* (2013.01); *F01N 2610/1406* (2013.01); *F01N 2610/146* (2013.01); *F01N 2610/1433* (2013.01); *F01N 2610/1453* (2013.01); *F01N 2610/1486* (2013.01); *F01N 2610/1493* (2013.01)

(56) References Cited

U.S. PATENT DOCUMENTS

| | | | |
|---|---|---|---|
| 2004/0031263 A1* | 2/2004 | Binder | F01N 3/2066 60/286 |
| 2007/0131180 A1 | 6/2007 | Roehm | |
| 2007/0186769 A1* | 8/2007 | Nishi | B01D 53/04 95/129 |
| 2011/0168128 A1* | 7/2011 | Bradley | F01N 3/005 123/294 |
| 2013/0025265 A1 | 1/2013 | Gundrum | |
| 2015/0231595 A1* | 8/2015 | Kim | F01N 3/2066 700/274 |
| 2018/0258812 A1 | 9/2018 | De Cesare et al. | |

OTHER PUBLICATIONS

Italian Patent Application No. 102017000025322 filed Mar. 7, 2017.
Italian Patent Application No. 102017000025325 filed Mar. 7, 2017.

* cited by examiner

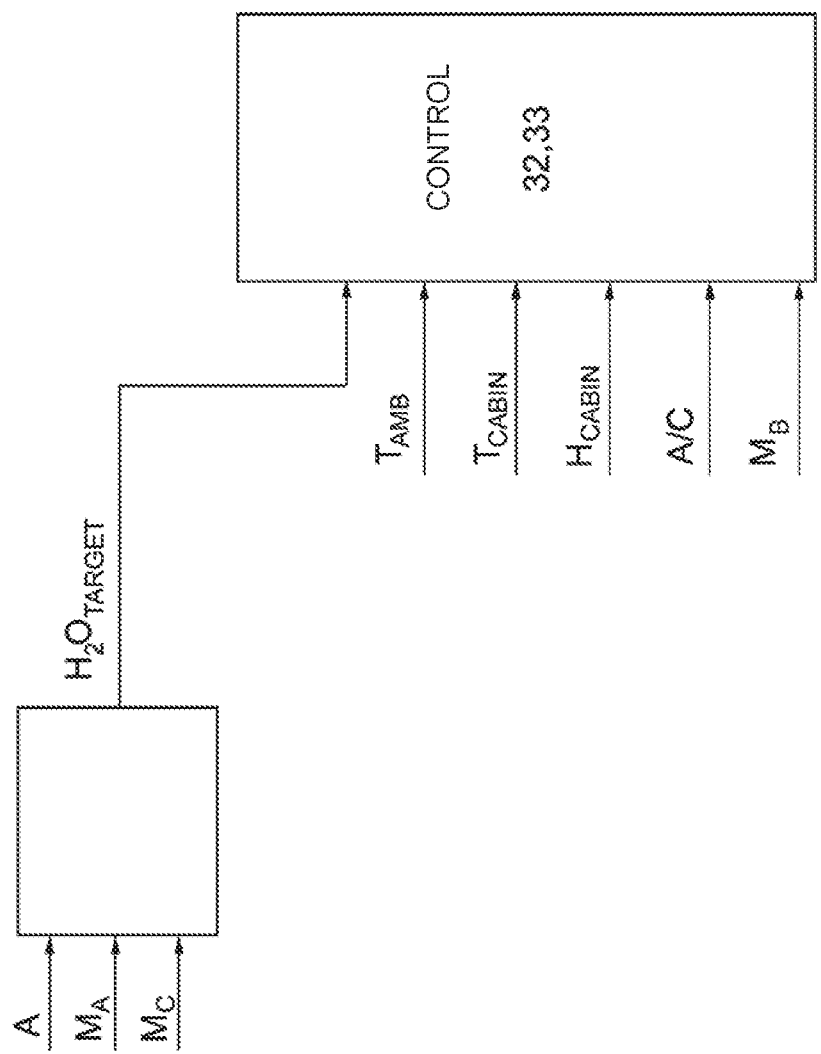

DEVICE TO SUPPLY AN INTERNAL COMBUSTION ENGINE WITH WATER COMING FROM A TANK OF AN EXHAUST SYSTEM PROVIDED WITH EXHAUST GAS AFTER-TREATMENT

CROSS-REFERENCE TO RELATED APPLICATIONS

This application claims priority from Italian Patent Application No. 102017000125342 filed on Nov. 3, 2017, the disclosure of which is incorporated by reference.

TECHNICAL FIELD

The invention relates to a device to supply an internal combustion engine with water coming from a tank of an exhaust system provided with exhaust gas after-treatment.

PRIOR ART

As it is known, international directives establishing the progressive reduction of the emissions of polluting gases produced by motor vehicles (the so-called "Euro5" and "Euro6" or "Tier2 Bin5" emission standards) set a very low limit for the quantity of $NO_x$ molecules that can be released into the atmosphere.

Compliance with these limits is very critical, especially for Diesel engines; for this reason, manufacturers have had the idea of providing the exhaust system of a Diesel engine with a selective catalytic reduction (SCR) system for $NO_x$, which is used to convert $NO_x$ molecules ($NO_2$ or NO) into water ($H_2O$) and nitrogen ($N_2$), which is an inert gas. The reaction of reduction of $NO_x$ molecules into nitrogen is difficult to be obtained without using an adequate reductant, typically ammonia ($NH_3$). The reductant must be injected into the exhaust system upstream of the SCR catalytic converter, so as to be mixed with exhaust gases before entering the SCR catalytic converter.

However, storing ammonia in a vehicle is hard to be handled due to evident safety reasons concerning the fact that ammonia is toxic. As a consequence, manufactures suggested storing and injecting a control fluid and, more in detail, a water solution of urea, which, because of the heat of the exhaust gases and partly due to a catalytic effect, decomposes into ammonia.

Therefore, the exhaust system is provided with a control fluid supplying device, which comprises an exhaust duct, a tank containing the control fluid, and an actuator, in particular an injector, which is designed to inject the control fluid under pressure coming from the tank into the exhaust duct. The supplying device further comprises a pump, which draws the control fluid from the tank and delivers the control fluid under pressure to the injector.

The control fluid is a reductant additive and, preferably, it is a water solution of urea, i.e. a 32.5% solution of urea, synthetic salt and demineralized water, commonly known as Ad-Blue. In use, because of the heat of the exhaust gases present inside the exhaust duct, the urea injected into the exhaust duct itself spontaneously decomposes into isocyanic acid (HNCO) and ammonia ($NH_3$), said ammonia operating as a reductant to help the reaction of resolution of $NO_x$ molecules into nitrogen ($N_2$) and water ($H_2O$). The isocyanic acid (HNCO), in turn, releases another mole of ammonia ($NH_3$) through hydrolysis.

Exhaust systems provided with exhaust gas after-treatment of the type described above are known, for example, from documents US2013025265 and EP3153676.

The tanks currently used for the water solution of urea have remarkable sizes, so that they can ensure approximately 10,000-15,000 km of autonomy before having to fill the tank; reducing the sizes of these tanks would lead to a burdening of drivers, who would be forced to refill the water solution of urea every 8,000 or 9,000 km.

Furthermore, in all internal combustion engines with excess oxygen which require a reduction of $NO_x$ molecules, the emissions of pollutant gases, in particular the emissions of $NO_x$, should be reduced also upstream of the SCR (Selective Catalytic Reduction) catalytic converter, in order to try and reduce the use of the control fluid.

For instance, US2007131180 and DE4341739 describe circuits provided with water collecting tanks and especially designed to directly introduce water into the intake manifold of the internal combustion engine or into a plurality of cylinders of the internal combustion engine. However, the addition of a further collecting tank leads to a significant increase in manufacturing costs and dimensions.

DESCRIPTION OF THE INVENTION

Therefore, the object of the invention is to provide a device to supply an internal combustion engine with water coming from a tank of an exhaust system provided with exhaust gas after-treatment, which is not affected by the drawbacks of prior art and is easy and cheap to be manufactured, without excessive cost increases.

According to the invention, there is provided a device to supply an internal combustion engine with water coming from a tank of an exhaust system provided with exhaust gas after-treatment according to the appended claims.

BRIEF DESCRIPTION OF THE DRAWINGS

The invention will now be described with reference to the accompanying drawings, showing a non-limiting embodiment thereof, wherein:

FIG. 3 is a block diagram showing the strategy used to determine the optimal quantity of water to the supplied to the tanks of FIGS. 2A and 2B.

PREFERRED EMBODIMENTS OF THE INVENTION

Figure 1:
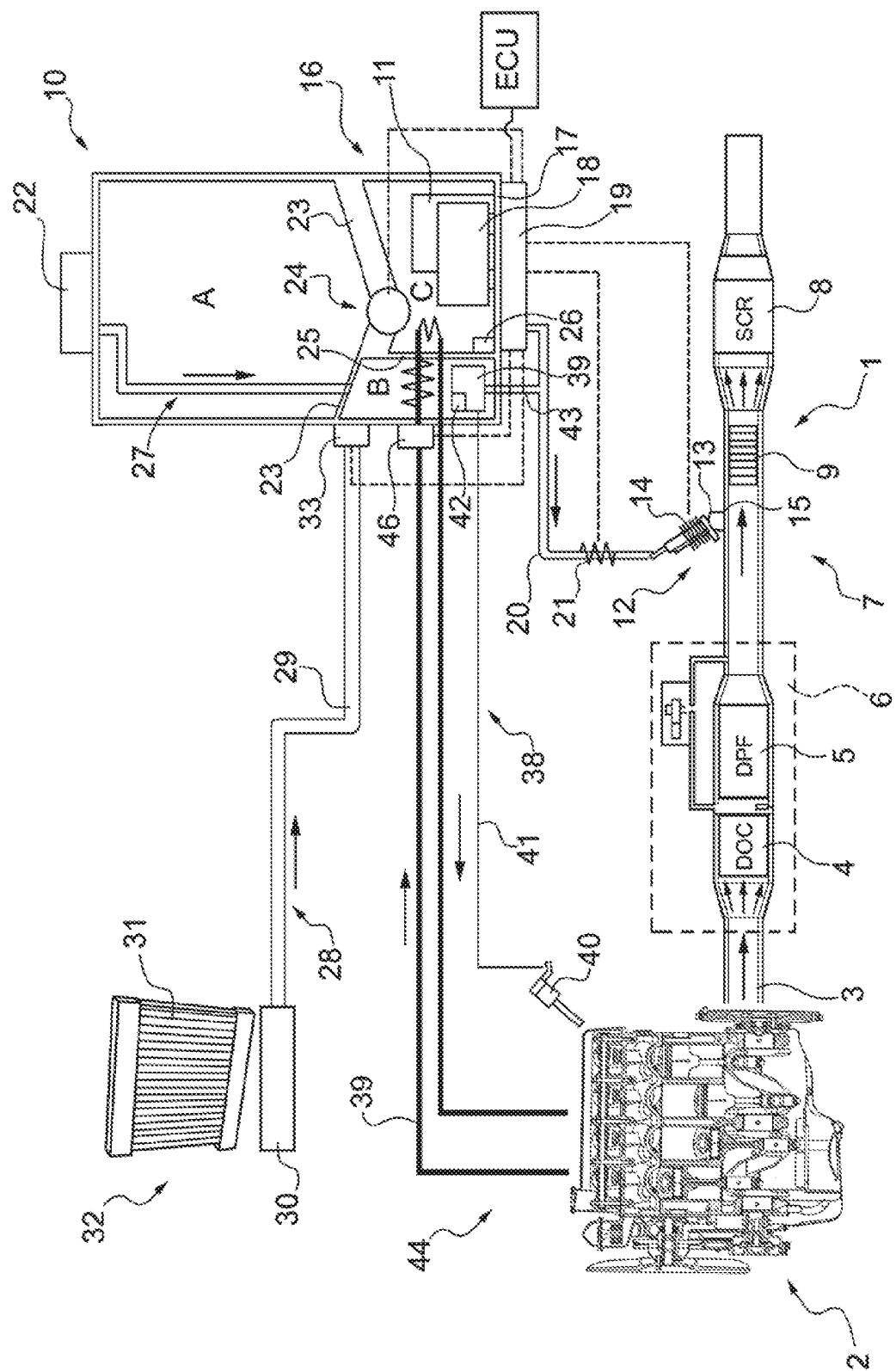
FIG. 1 schematically shows an internal combustion engine including a water supplying device according to the invention.

In FIG. 1, number 1 indicates, as a whole, an exhaust system to release—into the atmosphere—the gases produced by the combustion of an internal combustion engine 2 comprising an exhaust duct 3, which originates from an exhaust manifold. Along the exhaust duct 3 there are arranged, in succession, a Diesel oxidation catalyst 4 and a Diesel particulate filter 5. According to a first variant, the oxidation catalytic converter 4 and the Diesel particulate filter 5 are arranged one after the other inside a common tubular container 6. The oxidation catalytic converter 4 preferably is capable of also storing nitrogen oxides (Lean-NOx Trap/$NO_x$ storage catalyst).

The exhaust system 1 is provided with a selective catalytic reduction (SCR) system 7 for the after-treatment of $NO_x$ molecules (NO e $NO_2$), which is arranged along the exhaust duct 3 downstream of the Diesel particulate filter 5. According to the variant shown in FIG. 1, the SCR system 7 comprises one single SCR catalytic converter 8, which is arranged along the exhaust duct 3. According to a further variant, which is not shown herein, the SCR system 7 comprises an assembly of (usually three) SCR catalytic converters 8 arranged in series, which, together, optimize the SCR function for the after-treatment of $NO_x$ molecules.

According to a preferred variant, the SCR catalytic converter 8 and the Diesel particulate filter 5 are integrated inside a common tubular container.

According to a preferred variant, along the exhaust duct 3, upstream of the SCR catalytic converter 8, there is arranged a static mixer 9, which fulfils the function of generating turbulences in the exhaust gases present inside the exhaust duct 3.

The SCR system 7 comprises a tank 10 for the production of a control fluid and a pump 11, which draws from the tank 10 so as to supply the control fluid under pressure to an injection device 12 (known as urea dosing valve), which comprises a known electromagnetic injector 13 designed to inject the control fluid under pressure into the exhaust duct 3 and a connection element 13 to fix the electromagnetic injector 13 to a connection duct 15 laterally projecting out of the exhaust duct 3. The electromagnetic injector 13 is suited to inject the control fluid under pressure into the exhaust duct 3 alternatively upstream or downstream of the SCR catalytic converter 8.

The control fluid is a reductant additive and, preferably, it is a water solution of urea, i.e. a solution of urea, synthetic salt and demineralized water.

In use, because of the heat of the exhaust gases present inside the exhaust duct 3, the urea injected into the exhaust duct 3 itself spontaneously decomposes into isocyanic acid (HNCO) and ammonia ($NH_3$), said ammonia operating as a reductant inside the SCR system 7 so as to help the reaction of resolution of $NO_x$ molecules into nitrogen ($N_2$) and water ($H_2O$). The isocyanic acid NHCO also decomposes through hydrolysis, thus forming a molecule of ammonia ($NH_3$) and one of carbon dioxide ($CO_2$).

The SCR system 7 further comprises a supplying device 16 (also known as urea delivery module), which is connected to the tank 10 with the water solution of urea and comprises the pump 11 drawing from the tank 10 in order to supply the water solution of urea under pressure to the electromagnetic injector 13.

Therefore, the supplying device 16 comprises the pump 11, which is drowned inside the tank 10 and is fitted into the tank 10 from the bottom, namely through an opening (not shown) made in a lower wall 17 of the tank 10.

The supplying device 16 further comprises a heating body 18, which is also drowned inside the tank 10 and is arranged so as to completely surround the pump 11. The heating body 18 is made of a metal material or of a ceramic material or of another heat conductor material and, in use, is controlled by a control unit 19. The supplying device 16 further comprises a cartridge filter, which is also drowned inside the tank 10 and is arranged so as to completely or partially surround the pump 11.

The pump 11, which draws from the tank 10, is designed to supply the water solution of urea under pressure to the electromagnetic injector 13 through an outlet duct 20. The outlet duct 20 preferably is provided with a heating organ 21, which is controlled by the control unit 19.

According to a first variant, the pump 11 supplying the water solution of urea to the electromagnetic injector 13 is a rotary pump, which is designed to reverse the direction of rotation, so as to be able to both supply the water solution of urea under pressure to the electromagnetic injector 13 and, when needed, suck the water solution of urea present inside the supplying device 16 downstream of the pump 11 itself (i.e. in the outlet duct 20 and/or inside the electromagnetic injector 13). The pump 11 is suited to be controlled in a non-efficient manner, changing the sequence of the windings and generating a thermal power due to Joule effect, which facilitates the defrosting of the water solution of urea close to the pump 11.

Alternatively, the pump 11 supplying the water solution of urea to the electromagnetic injector 13 is a piston pump, which is provided with an electromechanical actuator.

The different ways in which the pump 11 can be controlled are described in Italian patent applications 102017000025322 and 102017000025325, which are entirely included herein as a reference.

Figure 2A:
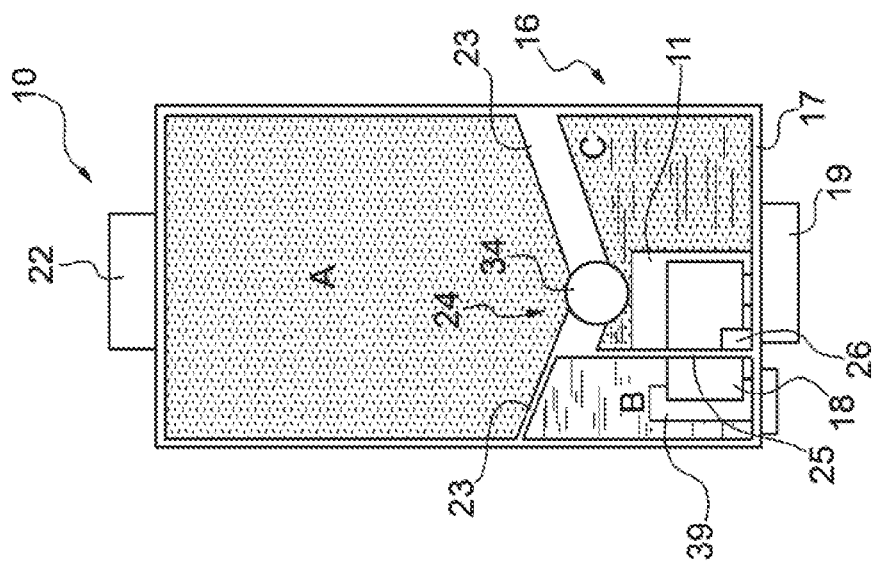
FIG. 2A schematically shows one embodiment of a tank of the exhaust system of FIG. 1 according to the invention.
Figure 2B:
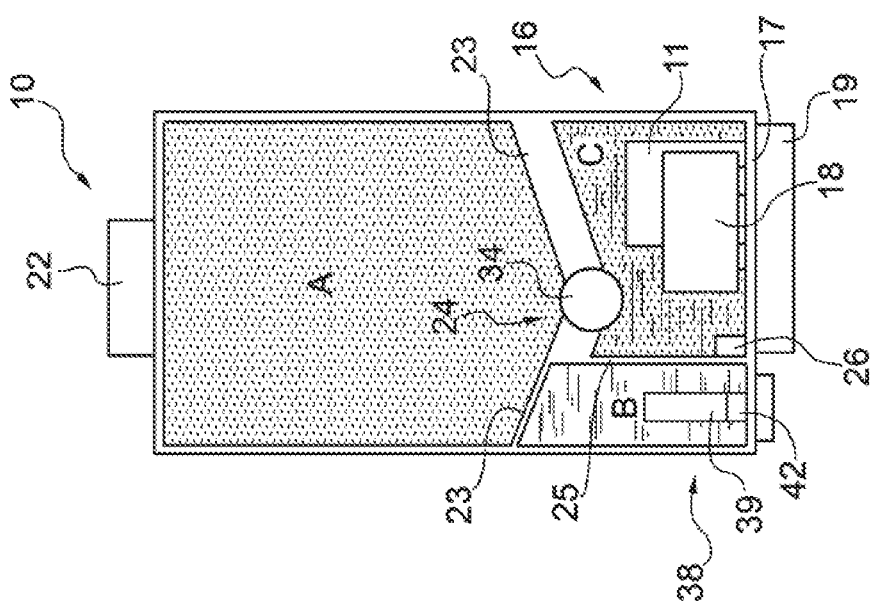
FIG. 2B schematically shows another embodiment of a tank of the exhaust system of FIG. 1 according to the invention.

According to FIGS. 2A and 2B, the tank 10 is divided into three areas indicated with A, B and C, which are separated by inner partitions.

In the upper area A there is stored powder urea. The area A is accessible from the top, so as to allow it to be filled with powder urea, and is closed by a cap 22.

The upper area A is separated from the lower portion of the tank 10 by means of two partitions 23, which are inclined so as to form a V-shape. The two partitions 23 converge towards a dosing device 24—The V-shaped inclination of the two partitions 23 allows the powder urea to be conveyed towards the dosing device 24, thus preventing the powder urea from settling on the walls of the area A.

The lower area of the tank 10, on the other hand, is divided into an area B, which collects water on the inside, and into an area C, where the water solution of urea is created with a variable concentration. The two areas B, C are separated by a wall 25, where a dosing valve 26 is arranged, which is controlled by the control unit 19 so as to allow the water to flow from the area B to the area C.

The tank 10 is made of a plastic material, preferably enriched with additives so as to increase the thermal insulation of the tank 10 from the outside.

The water collecting area B is supplied through a duct 27 (shown in FIG. 1) for manual filling, which can be accessed through the cap 22 and goes through the area A.

Furthermore, according to one variant shown in FIG. 1, the SCR system 7 comprises a water supply circuit 28, which comprises, in turn, a duct 29, which draws the water from the basin 30 collecting the condensate water of an evaporator 31 of a conditioning system 32 of the vehicle and leads it into the area B. The water flow is regulated by a three-way valve 33, which is housed on the tank 10, is controlled by the control unit 19 and allows the water to be introduced into the area B, if needed, or to be drained to the surrounding environment when the water quantity already contained in the area B is sufficient.

The different ways in which water can be supplied are described in Italian patent applications 102017000025322 and 102017000025325, which are entirely included herein as a reference.

The dosing device 24 is also described in Italian patent applications 102017000025322 and 102017000025325, which are entirely included herein as a reference.

According to a preferred embodiment, the control unit 19 is connected to a plurality of sensors, such as for example a temperature sensor to detect the current temperature of the water solution of urea inside the area C (open loop control mode), a level sensor to detect the level of the water solution of urea inside the area C and a sensor to detect the concentration of the water solution of urea inside the area C.

The SCR system 7 also comprises a water supplying device 38 (also known as water delivery module), which is connected to the tank 10 and comprises a pump 39 drowned in the water collecting area B, from which it draws the water to be supplied to at least one electromagnetic injector 40. The electromagnetic injector 40 is designed to dose and atomize the water, alternatively, into an intake manifold of the internal combustion engine 2. Alternatively, the electromagnetic injector 40 is designed to dose and atomize the water into a plurality of cylinders of the internal combustion engine 2.

Therefore, the supplying device 38 comprises the pump 39, which is fitted into the tank 10 from the bottom, namely through an opening (not shown) made in a lower wall 17 of the tank 10. The supplying device 38 further comprises a cartridge filter (not shown), which is also drowned inside the tank 10 and is arranged so as to completely or partially surround the pump 39.

According to a first variant, the pump 39 is a rotary pump, which is designed to reverse the direction of rotation, so as to be able to both supply the water to the electromagnetic injector 40 and, when needed, suck the water present downstream of the pump 39 itself (i.e. in an outlet duct 41 and/or inside the electromagnetic injector 40). Alternatively, the pump 39 supplying the water to the electromagnetic injector 40 is a piston pump, which is provided with an electromechanical actuator.

According to one embodiment, the control unit 19 is also connected to a temperature sensor to detect the current temperature of the water inside the area B, to a pressure sensor inside the area B, to a level sensor to detect the level of the water inside the area B and to a quality sensor for the water collected inside the area B. The pump 39 is designed to supply the water to the electromagnetic injector 40 through the outlet duct 41.

According to a first variant, the supplying device 16 is arranged inside the area C, where the water solution of urea is created, so that the heating body 18 can heat the water solution of urea (variant shown in FIG. 2A). In this case, the supplying device 38 preferably is provided with a heating organ 42, which is controlled by the control unit 19. The heating organ 42 is going to be activated in order to defrost the water collected inside the area B in case of temperatures below 0° C. The heating organ 42 is made of a metal material or of a ceramic material or of another heat conductive material and, in use, is controlled by the control unit 19.

According to a further variant, the supplying device 16 is arranged in the area of the wall 25, astride the water collecting area B and the area C, where the water solution of urea is created, so that the heating body 18 can heat both the water and the water solution of urea (variant shown in FIG. 2B). In this case, the supplying device 38 can also not have the heating organ 42 controlled by the control unit 19. The heating body 18 is going to be activated in order to defrost the water collected inside the area C in case of temperatures below 0° C.

According to one variant, the tank 10 is housed under the electromagnetic injector 40 and, preferably, under the electromagnetic injector 13. In other words, the tank 10 (and, hence, the pumps 11 and 39) is arranged at a lower level than the electromagnetic injector 40 (and, preferably, than the electromagnetic injector 13). In order to prevent the water solution of urea and/or the water from freezing inside the components (in particular, inside the injector 13, 40 and/or possible ducts), every time the vehicle is tuned off suitable strategies are implemented so as to empty the supplying device 16, 38, also known as purging of the supplying device 16, 38. The system emptying strategy involves, in case of rotary pumps 11, 39, controlling the pump 11, 39 so as to reverse the direction of rotation thereof in order to suck all the control fluid and/or the water present in the components downstream of the tank 10.

Alternatively, in case of piston pumps 11, 39, the strategy involves emptying the respective supplying device 16, 38 exploiting the aid of gravity, since the pumps 11, 39 are installed in the vehicle at a lower height than the corresponding injector 13, 40. In this way, by opening the injectors 13, 40 and by using a respective valve (not shown) placed close to the corresponding pump 11, 39 or to the tank 10, the supplying device 16, 38 is emptied. In particular, in the supplying device 38, the water can be collected and then be caused to flow into the tank 10 or on the outside thereof. The control unit 19 is configured to control the operation of the heating body 18 so as to allow the water solution of urea in the area C to be defrosted based on the current temperature detected by the temperature sensor.

Furthermore, according to the variant shown in FIG. 2B, the operation of the heating body 18 also allows for the heating of the water collected in the area B simultaneously with the heating of the water solution of urea contained in the area C, preferably based on the current temperature detected by the respective temperature sensor.

According to one variant, the water contained inside the area B is used for the conditioning of the electromagnetic actuator 13. There is a bypass duct 43 regulated by a valve (not shown) so as to control the passage of the water contained in the area B, which is then supplied for the conditioning of the electromagnetic injector 13 through the outlet duct 20.

The layout of the tank 10 shown in FIGS. 2A and 2B has a vertical extension, which helps the tank 10 be installed in the engine compartment of the vehicle. In this case, according to a preferred variant, the SCR system 7 also comprises a recirculation circuit 44 for the conditioning fluid of the combustion engine 2 (shown in FIG. 1). The recirculation circuit 44 comprises a duct 45 where the conditioning fluid flows at high temperatures and which goes through the area B and/or the area C in order to heat the water and/or the water solution of urea. The passage of the conditioning fluid is regulated by a valve 46, which is housed on the tank 10 and is controlled by the control unit 19, which permits a regulation of the transfer of heat from the conditioning fluid to the water or to the water solution of urea.

In use, the water coming from the area B and the powder urea coming from the area A get mixed in the area C; the water solution of urea obtained by so doing is removed by the pump 11 and supplied, through the outlet duct 20, to the electromagnetic injector 13.

The ways in which the ideal concentration of user in the solution can be determined are described in Italian patent applications 102017000025322 and 102017000025325, which are entirely included herein as a reference.

According to FIG. 3, the control unit 19 is configured to gather a number of parameters, such as:

the desired endurance A;

the quantity $M_C$ of water solution of urea in the area C through the dedicated level sensor; and the powder urea $M_A$ stored in the area A;

based on these parameters, the control unit determines the desired quantity $H_2O_{TARGET}$ of water to be introduced into the area B.

As far as the powder urea stored in the area A is concerned, this parameter can be determined through the signal sent by a pressure sensor or by a load cell housed in the area A, in particular, in the area of the two partitions 23 inclined so as to form a V-shape. According to a preferred variant, the pressure sensor or the load cell are overmoulded in one of the two partitions 23.

Alternatively, the quantity of powder urea stored in the area A can be determined, assuming of starting from a full load area A and knowing the number of rotations made by the dosing device 24, in accordance with the disclosure of Italian patent applications 102017000025322 and 102017000025325.

Therefore, the control unit 19 is configured to gather a number of parameters, such as:
- desired quantity $H_2O_{TARGET}$ of water to be introduced into the area B;
- room temperature $T_{AMB}$;
- temperature in the cabin of the vehicle $T_{CABIN}$;
- humidity in the cabin of the vehicle $H_{CABIN}$;
- A/C state of the conditioning system 32, whether active or turned off; and
- the quantity $M_B$ of water in the area B through the dedicated level sensor;

based on these parameters, the control unit controls the conditioning system 32 and the valve 33.

In case there is no level sensor designed to detect the quantity $M_B$ of water in the area B, the value of the quantity $M_B$ of water contained in the area B is estimated through a model, which indicates the quantity of water dosed into the intake manifold of the internal combustion engine 2 or into the plurality of cylinders of the internal combustion engine 2.

As already mentioned above, the area B is provided with a level sensor, which is connected to the control unit 19 and communicates with an electronic control unit ECU of the internal combustion engine 2. When, through the level sensor, a water level inside the area B is detected, which is below a limit value, and depending on the desired quantity $H_2O_{TARGET}$ of water to be introduced into the area B, the control unit 19 sends a signal to the electronic control unit ECU to control the conditioning system 32.

In order to make sure that the desired quantity $H_2O_{TARGET}$ of water to be introduced into the area B is made available by the supply circuit 28, the production of water must be ensured even in case the conditioning system 32 of the vehicle is not operating because the driver does not require the conditioning of the cabin.

The description above explicitly relates to the case of an internal combustion engine 2, but the tank 10 and the control method described above can advantageously be applied to any combustion engine with oxygen excess requiring a reduction of $NO_x$ molecules.

The water supplying device 38 is not provided with further water tanks designed to supply water under pressure to the electromagnetic injector 40. In other words, the water supplying device 38 exclusively comprises the tank 10. In other words, again, the water supplying device 38 is provided with one single tank 10. Therefore, there is no need for further tanks dedicated to supplying the water under pressure to the electromagnetic injector 40, but the water already available in the tank 10 is sufficient.

The tank 10 and the method described above have some advantages: first of all, they are easy to be manufactured and implemented, with a small impact on the costs of the system. In particular, the tank 10 allows for a greater endurance when dealing with the refilling of the water solution of urea compared to the water solution having a 32.5% concentration of urea, which is commonly used and known as Ad-Blue.

Furthermore, the presence of the water supplying device allows the emissions of polluting gases, in particular the emissions of $NO_x$, to be reduced even upstream of the SCR system 7, so as to try and reduce the use of the control fluid through the introduction of water directly into the intake manifold of the internal combustion engine 2 or into the plurality of cylinders of the internal combustion engine 2.

The invention claimed is:

1. A device (38) to supply an internal combustion engine (2) with water comprising one single tank (10) of an exhaust system (1) provided with exhaust gas after-treatment having an exhaust duct (3) and a first electromagnetic injector (13) designed to inject a water solution of urea under pressure into the exhaust duct (3); the tank (10) comprises a supplying device (16) to supply a water solution of urea provided with a first pumping device (11), which is drowned inside the tank (10) and draws from the tank (10) in to order to supply the water solution of urea under pressure to the first electromagnetic injector (13); the tank (10) is divided so as to have, on the inside, a first powder urea storage area (A) and a second water collecting area (B), and wherein the powder urea and the water are mixed in a third area (C) of the tank (10) so as to obtain a water solution of urea with a variable concentration, the device is characterized in that the device (38) comprises at least one second electromagnetic injector (40), which is designed to inject water into the internal combustion engine (2), and a second pumping device (39), which is drowned inside the tank (10) and draws from the second water collecting area (B) in order to supply water under pressure to said at least one second electromagnetic injector (40).

2. A device according to claim 1, wherein there are no further water tanks designed to supply water under pressure to said at least one second electromagnetic injector (40).

3. A device according to claim 1, wherein the water supplying device (38) is provided with a heating organ (42), which is designed to be activated for the defrosting of the water and is made of a thermally conductive material.

4. A device according to claim 1 and comprising a bypass duct (43), which is regulated by a valve to control the passage of the water contained in the tank (10), which is supplied for the conditioning of the first electromagnetic injector (13) through the outlet duct (20).

5. A device according to claim 1, wherein the first and/or the second pumping device (11, 39) are piston pumps provided with an electromechanical actuator.

6. A device according to claim 5, wherein the tank (10) is arranged at a lower level than the second electromagnetic injector (40) and/or to the first electromagnetic injector (13), so as to help empty, respectively, the water supplying device (38) and the supplying device (16) from a water solution of urea using the contribution of gravity.

7. A device according to claim 1, wherein the first and/or the second pumping device (11, 39) are rotary pumps designed to reverse the direction of rotation so as help emptying, respectively, the water supplying device (38) and the supplying device (16) from a water solution of urea.

8. A device according to claim 1, wherein the tank (10) is made of a plastic material enriched with additives to increase the thermal insulation of the tank (10) from the outside.

9. A device according to claim 1, wherein the tank (10) comprises a heating body (18), which is made of a heat conductive material, is drowned inside the tank (10) and is arranged so as to at least partially surround the first pumping device (11).

10. A device according to claim 9, wherein the first pumping device (11) and the heating body (18) are arranged inside the third area (C) so that the heating body (18) can heat the water solution of urea.

11. A device according to claim 9, wherein the first pumping device (11) and the heating body (18) are arranged in the area of a separation wall (25) separating the third area (C) from the second area (B) so that the heating body (18) can heat both the water and the water solution of urea.

12. A device according to claim 1, wherein the second electromagnetic injector (40) is designed to directly inject water into an intake manifold and/or cylinders of the combustion engine (2).

\* \* \* \* \*